US012109725B2

(12) United States Patent
Stefani et al.

(10) Patent No.: US 12,109,725 B2
(45) Date of Patent: Oct. 8, 2024

(54) METHOD FOR PRESSING CERAMIC SLABS

(71) Applicant: SYSTEM CERAMICS S.P.A., Fiorano Modenese (IT)

(72) Inventors: Franco Stefani, Sassuolo (IT); Franco Gozzi, Formigine (IT); Ivan Ghirelli, Castellarano (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 391 days.

(21) Appl. No.: 17/040,630

(22) PCT Filed: Mar. 25, 2019

(86) PCT No.: PCT/IB2019/052401
§ 371 (c)(1),
(2) Date: Sep. 23, 2020

(87) PCT Pub. No.: WO2019/186365
PCT Pub. Date: Oct. 3, 2019

(65) Prior Publication Data

US 2021/0114254 A1 Apr. 22, 2021

(30) Foreign Application Priority Data

Mar. 26, 2018 (IT) ........................ 102018000003939

(51) Int. Cl.
*B28B 13/02* (2006.01)
*B28B 3/02* (2006.01)
*B28B 17/00* (2006.01)

(52) U.S. Cl.
CPC .............. *B28B 13/022* (2013.01); *B28B 3/02* (2013.01); *B28B 17/00* (2013.01)

(58) Field of Classification Search
CPC ........... B28B 3/12; B28B 11/12; B28B 11/14; B28B 11/125; B28B 13/02; B28B 3/02;
(Continued)

(56) References Cited

U.S. PATENT DOCUMENTS 2,208,054 A * 7/1940 Reed ..................... B28B 13/022 425/130
2,218,196 A * 10/1940 Hagar ................... B30B 11/027 425/130
(Continued)

FOREIGN PATENT DOCUMENTS

AU 662837 B * 9/1995 ............. B28B 1/002
CN 1426881 A 7/2003
(Continued)

OTHER PUBLICATIONS

Bigi et al. (EP-1323510-A1) (Year: 2003).*
(Continued)

*Primary Examiner* — Jeffrey M Wollschlager
*Assistant Examiner* — Edgaredmanuel Troche
(74) *Attorney, Agent, or Firm* — PEARNE & GORDON LLP

(57) ABSTRACT

A pressing method for pressing ceramic slabs, comprising the following steps: spreading a layer (1) of granular or powdered material onto a pressing plane (2), wherein the layer (1) comprises at least a first zone (11), with a prefixed area and border, made of a granular or powdered primary material, and at least a second zone (12), with a prefixed area and border, made of a granular or powdered secondary material different from the primary material; pressing the layer (1) using a press (P); separating at least a main portion (10) of the first zone (11) from the second zone (12).

18 Claims, 4 Drawing Sheets

(58) Field of Classification Search
CPC ........... B28B 3/123; B28B 5/02; B28B 5/027; B28B 13/0215; B28B 13/022; B28B 13/0295; B28B 13/0255; B28B 2005/041–048; B30B 5/06; B30B 15/30; B30B 15/308; B30B 15/28; B30B 15/306; B30B 9/248
USPC ...... 425/168; 264/673, 303, 645, 318, 297.9
See application file for complete search history.

(56) References Cited

U.S. PATENT DOCUMENTS

| | | | | | |
|---|---|---|---|---|---|
| 3,171,173 | A | * | 3/1965 | Ingala | B22D 7/10 249/204 |
| 3,540,093 | A | * | 11/1970 | Boatright, Jr. | B28B 13/0205 425/161 |
| 7,335,323 | B2 | | 2/2008 | Makino et al. | |
| 9,186,819 | B1 | | 11/2015 | Jon, II et al. | |
| 9,487,444 | B2 | * | 11/2016 | Koszo | C04B 33/00 |
| 9,718,303 | B2 | | 8/2017 | Jon, II et al. | |
| 9,993,942 | B2 | | 6/2018 | Jon, II et al. | |
| 9,993,943 | B2 | | 6/2018 | Jon, II et al. | |
| 10,300,626 | B2 | | 5/2019 | Jon, II et al. | |
| 10,981,346 | B2 | | 4/2021 | Jon, II et al. | |
| 11,498,298 | B2 | | 11/2022 | Jon, II et al. | |
| 2004/0151872 | A1 | | 8/2004 | Makino | |
| 2014/0199553 | A1 | * | 7/2014 | Sadler | B28B 17/0036 156/73.6 |
| 2015/0042006 | A1 | | 2/2015 | Kager | |
| 2020/0039108 | A1 | * | 2/2020 | Scardovi | B28B 5/027 |
| 2021/0114254 | A1 | | 4/2021 | Stefani | |

FOREIGN PATENT DOCUMENTS

| | | | | | |
|---|---|---|---|---|---|
| CN | 1517191 | A | | 8/2004 | |
| CN | 1906001 | A | | 1/2007 | |
| CN | 1906001 | B | | 1/2007 | |
| CN | 107073743 | A | | 8/2017 | |
| EP | 392593 | A | * | 10/1990 | B28B 13/023 |
| EP | 927687 | A2 | * | 7/1999 | B28B 1/005 |
| EP | 1283097 | A2 | * | 2/2003 | B28B 1/005 |
| EP | 1321256 | A2 | | 6/2003 | |
| EP | 1323510 | A1 | * | 7/2003 | B28B 13/022 |
| EP | 1356909 | A2 | * | 10/2003 | B28B 3/00 |
| EP | 2801457 | A1 | | 11/2014 | |
| IT | 1191800 | B | * | 3/1988 | B28B 13/022 |
| JP | 101259906 | A | | 10/1989 | |
| WO | WO-9823424 | A2 | * | 6/1998 | B28B 1/005 |
| WO | 2008038116 | A2 | | 4/2008 | |
| WO | WO-2009010361 | A1 | * | 1/2009 | B28B 13/022 |
| WO | 2019/186365 | A1 | | 10/2019 | |

OTHER PUBLICATIONS

Engmann D (EP-392593-A) (Year: 1990).*

Office Action issued in Chinese Patent Application No. 201980020577.X, Dated Aug. 4, 2021, 12 pages.

Office Action/Examination Report issued in Indian Patent Application No. 202027036411, Date of Dispatch/Email: Apr. 21, 2022, 5 pages.

* cited by examiner

METHOD FOR PRESSING CERAMIC SLABS

The present invention relates to a method for pressing ceramic slabs or tiles.

Presses suitable for producing ceramic tiles, normally hydraulic, have undergone a substantial evolution, especially in the last decade, with the arrival of large ceramic slabs, up to 1800 mm in width and 3600 mm in length.

Traditional presses, used for producing small formats, are conceptually designed to contain deformations of the components that exert pressure on the powders to be compacted. Deformations of the structure of the press are mainly due to the fact that the presser element, i.e. the hydraulic cylinder, has a circular section, a substantially different shape from the shape of the tile(s) to be pressed. The components of the press, mainly the base of the press and the movable cross member, therefore have a notable thickness in order to be able to allow the system to uniformly distribute the pressing force on the surface of the tiles, so as to maintain as uniform pressure as possible.

To attempt to overcome the deformation problems generated by the bending moments triggered by the different geometry between the presser element and the tiles, other corrective measures have been introduced in moulds, for example isostatic moulds, also designed to compensate for any non-uniformity in the loading of the powders.

With the arrival of large formats, traditional presses have demonstrated great limits, that often cannot be overcome, that have limited the use thereof.

More recent presses, created for large formats, develop up to 5/10 times the force of traditional presses, overcoming the rigidity limits imposed by the geometries of the structures.

The design concept of these new presses is not based on containing/eliminating deformations, but is based on the control and management of the deformations undergone by the structure of the press. In summary, new presses are structured so as to undergo greater, but controlled and uniform, deformations that allow the pressing force to be distributed more uniformly on the ceramic product. In these new presses, the cylinder that generates the necessary thrust is substantially rectangular (or square), with the same maximum dimension as the tile/slab to be produced.

The structure of presses for large formats comprises a series of annular elements, known as ribs, which are aligned with each other so as to define a compartment in which the cylinder or presser element is inserted. The cylinder is therefore surrounded by the various ribs, adjacent to each other, that contrast the thrust exerted by the cylinder on the slabs.

This structure is modular with respect to a longitudinal dimension of the slab to be produced, and may be easily extended during the design phase by increasing the number of ribs that compose the main structure. In these modular structures, by pressing the maximum format possible, the ribs are strained in the same way and the deformations are substantially identical, thus allowing the pressure to be kept uniform on the ceramic product.

In this type of press, for producing smaller formats than the maximum format allowed by the press, it is therefore necessary to use the available presser, which can be oversized. For pressing smaller formats than the maximum one, format thickness compensators are currently used, i.e. elements that replace the missing material with respect to the maximum format. Such compensators have the job of sustaining the thrust of the presser cylinder in the zones where the presence of powder is not envisaged. In fact, these compensators simulate the presence of powder to be compacted, so as to uniform the deformations of the structure, as would take place when pressing the maximum format.

The use of the compensators has some disadvantages.

Above all, the compensators are subject to wear and must be periodically replaced. A further disadvantage comes from the fact that it can be difficult to correctly coordinate the thickness and format of the compensators with the format required for the ceramic product.

Other examples of technologies that do not solve the problem of allowing the correct pressing of smaller formats than the maximum format envisaged for a given press are described in documents WO 2009/010361 and EP 2801457.

The object of the present invention is to offer a method for pressing ceramic slabs or tiles which allows the drawbacks summarised above to be overcome.

Characteristics and advantages of the present invention will more fully emerge from the following detailed description of an embodiment of the invention, as illustrated in a non-limiting example in the accompanying figures, in which.

Figure 3A:
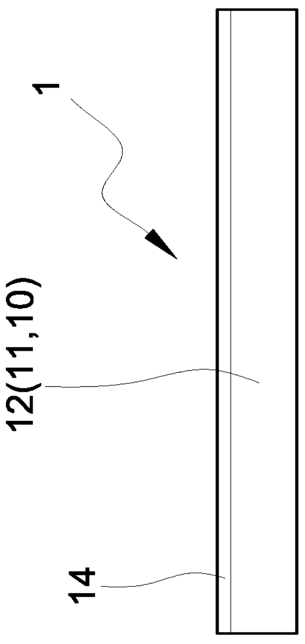
FIG. 3 shows a lateral view of the layer (1) obtained with a possible embodiment of the method.
Figure 3:
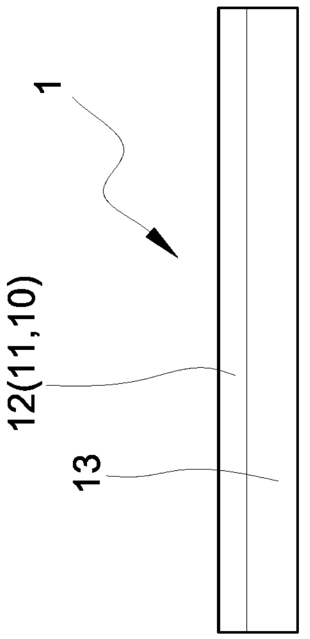
Figure 4:
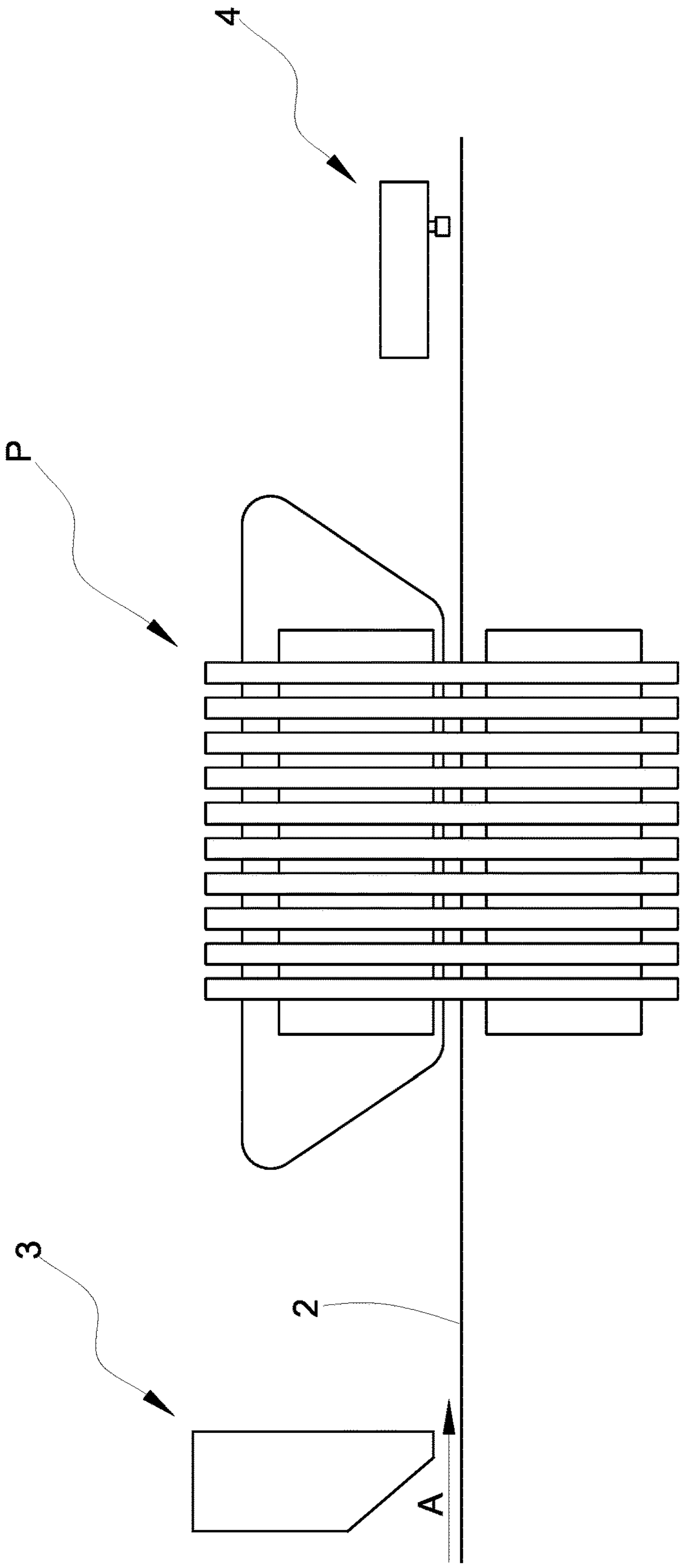
Figure 5:
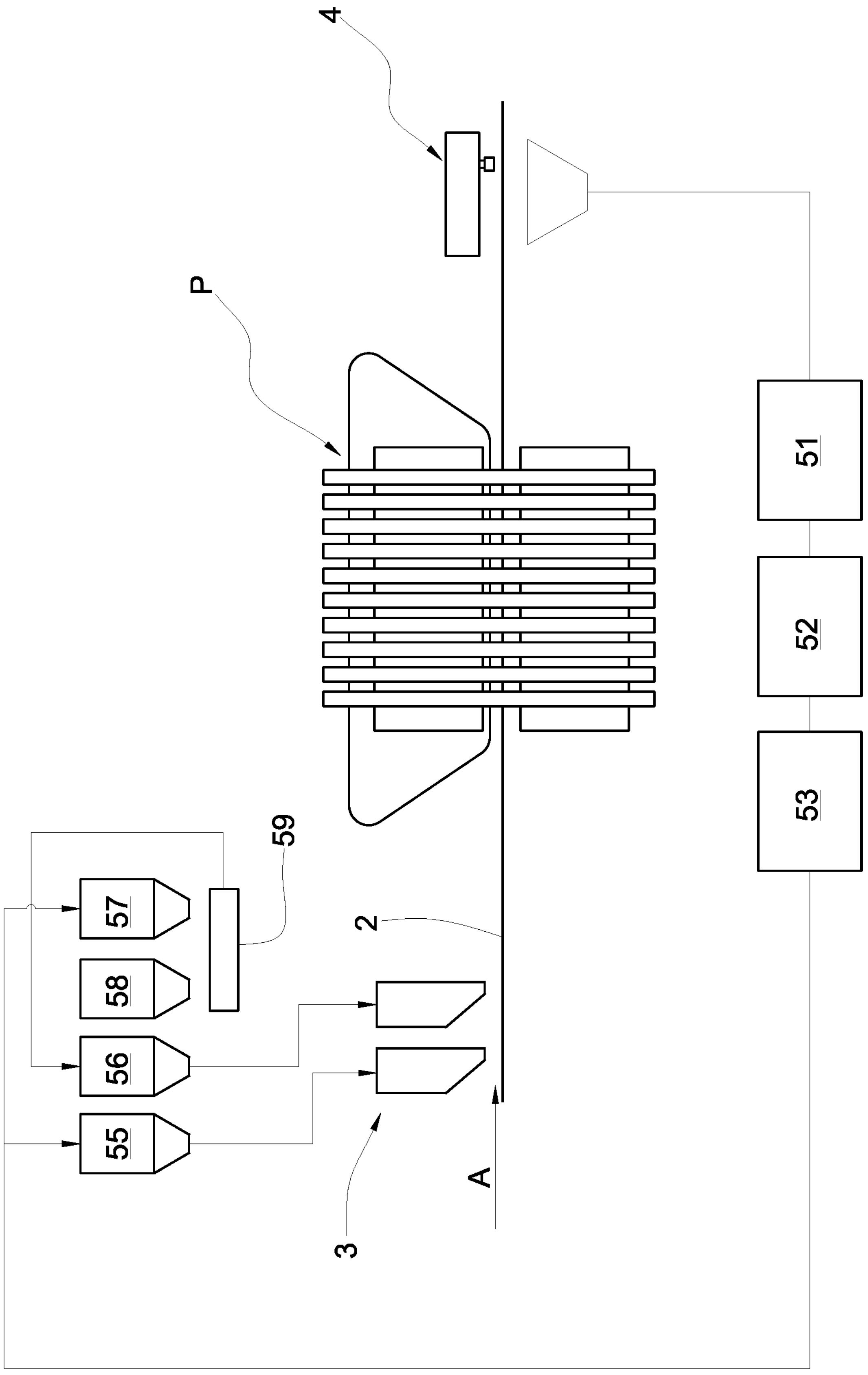

FIG. 3*a* shows a lateral view of the layer (1) obtained with a further possible embodiment of the method;

FIG. 4 shows a schematic view of a system that can be used for the actuation of the method;

FIG. 5 shows a schematic view of a further possible embodiment of a system that can be used for the actuation of the method.

The method according to the present invention can be advantageously, but not exclusively, actuated with a pressing device that comprises a pressing plane (2), for example in the form of a movable or stationary plane, on which a press (P) operates, predisposed to exert a pressing action on the pressing plane (2). The pressing device further comprises a feeder device (3), arranged above the pressing plane (2) and structured so as to deposit a layer (1) of granular or powdered material on the pressing plane (2).

The pressing plane (2) may be continuous, such as in the example represented in FIG. 4, or may comprise a loading portion followed by a pressing portion. In the case of FIG. 4, the layer (1) is deposited on the pressing plane (2) which also extends in the press (P), so that the layer (1) is spread and pressed onto the pressing plane (2) itself. In the second case, the layer (1) is deposited on the loading portion of the pressing plane, and from there is transferred onto the pressing portion, distinct from the loading portion, which extends in the press (P), and on which the pressing of the layer (1) takes place.

In a further possible embodiment of the method, the layer (1) could be deposited internally of a pressing die. In that case, the pressing plane (2) is contained internally of the die and the feeder device (3) is configured to spread the layer (1) onto the pressing plane (2) internally of the pressing die.

The press (P) may be of any type. For example, the press (P) may be of the traditional type, having a structure with ribs inside which the pressing piston is arranged (as depicted in FIG. 4), or may be of the continuous type, wherein the pressing is performed between two movable belts, overlapping with each other, which converge in an advancement direction so as to gradually compress the layer of granular or powdered material.

Figure 1:
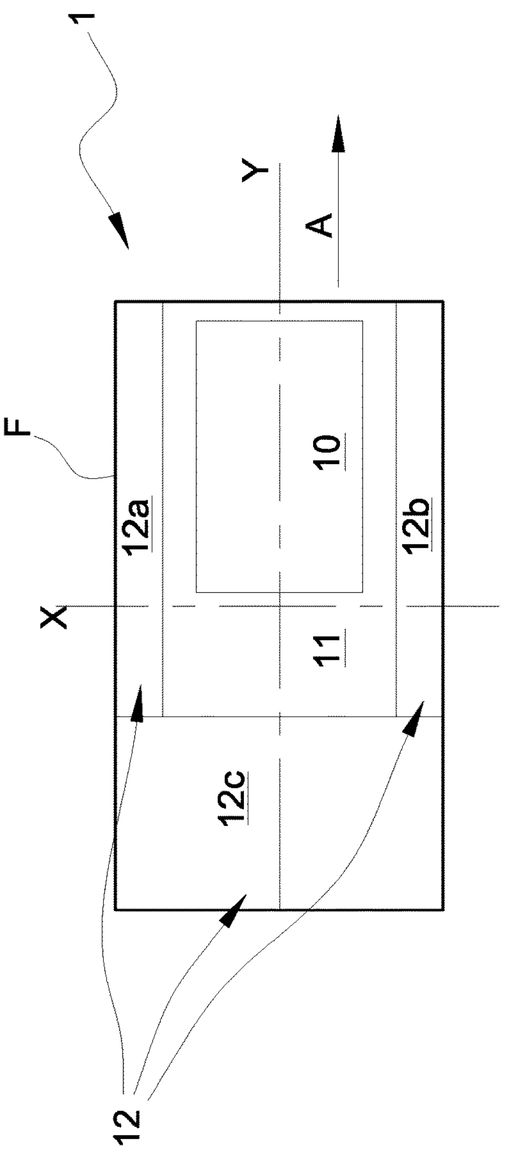
FIG. 1 shows a plan view of a layer (1) of granular or powdered material obtained with the method according to the present invention.
Figure 2:
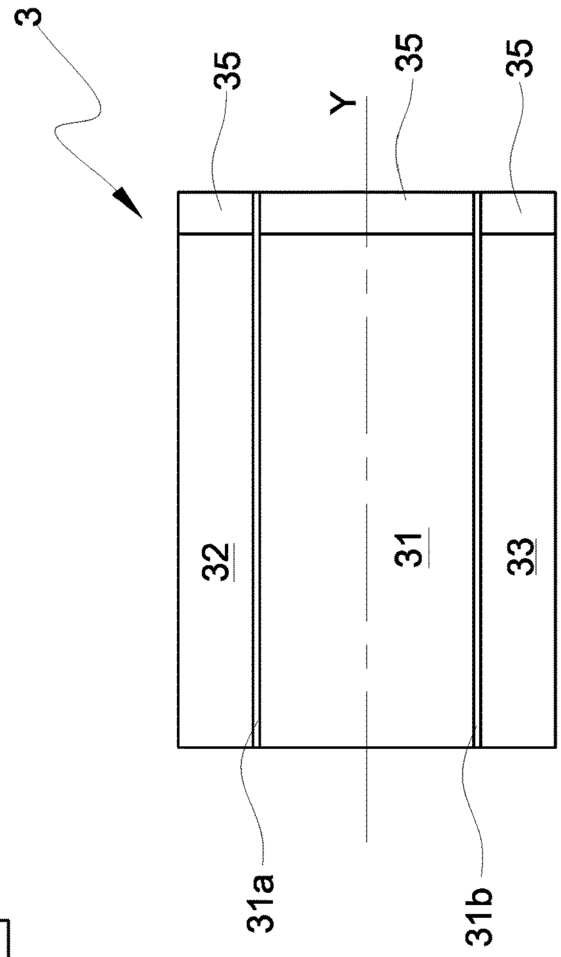
FIG. 2 shows a feeder device (3) that can be used for the actuation of the method, seen from above.

The press (P) is structured to press a maximum format (F), represented in FIG. 1, which is defined by a maximum border and area in which the layer (1) can be spread. The border is for example a rectangle or a square, but could have other shapes. In other words, the maximum format (F) is substantially the maximum area, delimited by a prefixed border, which may occupy the layer (1).

The method for pressing ceramic slabs according to the present invention envisages the spreading of a layer (1) of granulated or powdered material on a pressing plane (2).

The layer (1) comprises at least a first zone (11), with a prefixed area and border, made of a granular or powdered primary material, and at least a second zone (12), with a prefixed area and border, made of a granular or powdered secondary material different from the primary material. As shown in the figures, the first zone (11) has a reduced format, in terms of surface area and/or length of the sides, with respect to the maximum format (F) for which the press (P) is structured. In other words, the first zone (11) is contained within the maximum format (F), i.e. it does not fully occupy the maximum format (F). As already underlined, the maximum format (F) is substantially the maximum area that can be pressed by the press (P), i.e. the maximum area, delimited by the border of the maximum format (F), which the layer (1) to be pressed can occupy. The second zone (12) is substantially configured to fill the differences between the maximum format (F) and the reduced format defined by the first zone (11). In other words, the total area and border provided by the area and border of the first zone (11) and the second zone (12) substantially correspond to the area and border of the maximum format (F) for which the press is structured (P). Thanks to the spreading of a layer (1) comprising the first and the second zone (11,12), the press (P) operates in ideal conditions, i.e. it exerts its action on the maximum format (F) for which it is configured, so that the deformations undergone by the structure of the press are uniform and correspond to the envisaged ones, and the layer (1) undergoes uniform pressure on its entire surface.

For the first zone (11) a primary material can be used, having prefixed characteristics, different from the material used for the second zone (12). The primary material, for example, may have a different particle size and/or a different composition with respect to the secondary material. The secondary material may be different from the primary material due to a different or lower number of pressings undergone. As will be clarified better in the following description, the material of the second zone (12), and possibly a part of the material of the first zone (11), can be reused various times to form the second zone (12) of subsequent layers (1) in the production cycle. In that case, the material that is reused various times differs from the primary material in that it has undergone various pressing cycles.

In general, the primary material, which forms the first zone (11) intended to compose the final ceramic slab, is a better quality material than the secondary material, which is instead used to compensate the different dimensions of the format of the first zone (11) with respect to the maximum format (F) of the press (P). This allows the total cost of the material necessary for making the ceramic slab to be reduced.

The layer (1), comprising the first and the second zone (11,12) can therefore be pressed using the press (P). Subsequently, the method according to the present invention envisages separating at least a main portion (10) of the first zone (11) from the second zone (12). The main portion (10) substantially defines the format of the slab that is to be made. The main portion (10) may be split into a determined number of portions with a smaller surface area, for making smaller format tiles.

The main portion (10), which is whole or split into portions with a smaller surface area, can be subsequently subjected to firing to obtain a slab or one or more ceramic tiles.

Preferably, but not necessarily, the main portion (10) has a smaller surface area with respect to the first zone (11), i.e. the main portion (10) is contained within the first zone (11). This makes it possible to prevent the boundary between the first zone (11) and the second zone (12) only partially falling within the main portion (10), i.e. preventing the main portion (10) from comprising the secondary material. However, it is possible that the main portion (10) can substantially coincide with the first zone (11), or have a larger surface area. In these two cases, the method could envisage a step of trimming the main portion (10) after firing.

In any case, the main portion (10) is made with the primary material, selected to confer prefixed characteristics to the slab following the firing process.

To further reduce the consumption of material, it is possible to recover and reuse the granular or powdered material separated from the main portion (10) for spreading the second zone (12) with another layer (1), spread in a subsequent step of the production cycle.

The granular or powdered material separated from the main portion (10) can therefore comprise both the secondary material, and the primary material, in the case in which the main portion (10) is contained within the first zone (11), or can substantially comprise only the secondary material, in the case in which the main portion (10) substantially coincides with the first zone (11).

Preferably, the primary material is only used once, i.e. it does not contain material recovered from layers (1) previously made. The secondary material instead comprises secondary material recovered from the layers (1) as they are processed, to which the primary material is added which, at each layer (1), is separated from the main portion (10). The secondary material, which is substantially only used to compensate for the smaller dimensions of the first zone (11) with respect to the maximum format (F) of the press (P), and does not need to sustain the firing process, can be reused for making more ceramic slabs and for more production cycles.

At the beginning of a production cycle, in a first performance of the method, the spreading of the layer (1) can be performed using the primary material only. Such layer (1) therefore undergoes the pressing step and the subsequent step of separating the main portion (10). The material separated from the main portion (10) can be recovered and used as a secondary material in the spreading of the subsequent layer (1), and so on for the following layers (1).

Preferably, the secondary material is maintained with substantially constant properties, i.e. the relative quantities of the first and the secondary material are kept constant throughout the production cycle, i.e. for performing the various layers (1) that are spread in succession during the production cycle. The secondary material could possibly be subjected to an adaptation process, at each determined number of use cycles, to re-obtain a prefixed particle size and/or composition.

For example, the secondary material can be subjected to a crushing step and/or a particle size selection or screening step and/or to a moistening step and/or to a mixing step with a predefined quantity of primary material.

Furthermore, it is possible to provide for the granular or powdered material separated from the main portion (10) in every layer (1) to be mixed, in a determined quantity, with the primary material to be used for spreading the first zone (11) of another layer (1).

The recovered secondary material can be used, preferably mixed with the primary material, also possibly for spreading a base or intermediate layer (13) in the thickness of a layer (1). In other words, the layer (1) could be formed by various layers overlapping with each other. The secondary material could be used for spreading a uniform base layer, onto which the layer (1) can be subsequently spread, comprising the first and the second zone (11,12), or for spreading an intermediate layer (13), interposed between two layers of which at least the upper layer comprises the first and the second zone (11,12).

It is also possible to spread a surface layer (14) of primary material above the layer (1). In substance, after spreading the layer (1) comprising the first and the second zone (11,12), it is possible to arrange a surface layer (14) of primary material above the layer (1). In that case, the portions of the surface layer (14) that are overlapping with the zones of the layer (1) removed from the main portion (10), are also removed and can be reused for the composition of the secondary material.

Rather than using the primary material, the surface layer (14) could be composed of a third material, different from the primary and from the secondary material. For example, the third material could be particularly refined and/or have a composition that makes it particularly suitable for making the surface layer of a ceramic tile or slab, i.e. for making the visible face of the ceramic product.

In that case, the third material becomes part of the material recovered from the separation of the main portion (10) from each layer (1). Such recovered material, also comprising the third material, can be used for the composition of the first zone (11) of the layers (1) subsequently performed during the production cycle.

In a possible embodiment of the method, the second zone (12) comprises one or more lateral zones (12*a*,12*b*,12*c*) flanked to the first zone (11).

In the embodiment shown, the first zone (11) has a rectangular border. Such rectangular border has two longitudinal sides, parallel to a longitudinal direction (Y), and two transversal sides, parallel to a transversal direction (X) perpendicular to the longitudinal direction (Y). The first zone (11) is contained in a larger area, substantially corresponding to the maximum format (F) of the press (P). The maximum format (F) has a rectangular border.

The second zone (12) can therefore comprise one or more lateral zones (12*a*,12*b*), flanked to the opposite longitudinal sides of the first zone (11), and/or one or two transversal zones (12*c*) flanked to the opposite transversal sides of the first zone (11). The presence and dimensions of the lateral zones (12*a*,12*b*) and the transversal zones (12*c*) substantially depend on the shape and dimensions of the first zone (11). In substance, as already underlined, the lateral zones and the transversal zones (12*a*,12*b*,12*c*), added to the first zone (11), define the maximum format (F) that can be produced with the given press (P).

The device for pressing ceramic slabs according to the present invention is provided with a feeder device (3). Overall, the feeder device (3) is structured to spread a layer (1) of granular or powdered material comprising at least a first zone (11), with prefixed area and border, made with the granular or powdered primary material, and at least a second zone (12), with prefixed area and border, made with granular or powdered secondary material different from the primary material.

The spreading of the layer (1) takes place through relative motion between the feeder device (3) and the pressing plane (2) along a longitudinal advancement direction (Y). In a possible embodiment, the feeder device (3) is static, while the pressing plane (2) advances along the longitudinal direction (Y). Vice versa, in an alternative embodiment, the pressing plane (2) is static, while the feeder device (3) is movable along the longitudinal direction (Y). It would also be possible for the feeder device (3) and the pressing plane (2) to both be movable along the longitudinal direction (Y).

The feeder device (3) is provided with a lower opening (35), equipped with an unloading door movable between an opening position, in which the granular material can fall onto the pressing plane (2), and a closing position, in which the granular material cannot fall.

In a possible embodiment, the feeder device (3) is provided with two or more separate compartments (31,32,33), each intended to contain the primary material or the secondary material. For example, the feeder device (3) comprises a hopper (31) equipped with two internal separators (31*a*,31*b*) that separate three compartments (31,32,33). A central compartment (31) is intended to contain the primary material for the first zone (11). The two lateral compartments (32,33) are intended to contain the secondary material for the lateral zones (12*a*,12*b*). Preferably, the distance between the two internal separators (31*a*,31*b*) is adjustable, to allow the width of the first zone (11) and of the lateral zones (12*a*,12*b*) to be varied, measured along the transversal direction (X). In an alternative embodiment, the feeder device (3) could comprise distinct hoppers, each intended to contain the first or the secondary material. The feeder device (3) can also be provided with one or two compartments, or further distinct hoppers, for spreading the transversal zones (12*c*).

To facilitate the spreading of the layer (1), if it is necessary to reduce the length of the first zone (11), measured along the longitudinal direction (Y), it is preferable to arrange only one transversal zone (12*c*) located following the first zone (11), i.e. located downstream of the first zone (11) with respect to the advancement direction (A). For that purpose, the feeder device (3) can be provided with a further compartment, equipped with an unloading opening, or can be equipped with a separate hopper, equipped with an unloading opening.

The pressing device according to the present invention, also comprises a trimming device (4), predisposed and structured to separate the main portion (10) of the first zone (11) from the second zone (12). For example, the trimming device (4) comprises two tools arranged so as to laterally trim the main portion (10), removing the lateral zones (12*a*,12*b*), and a tool arranged so as to transversally trim the main portion (10), removing any transversal zone (12*c*). The tools that can be used for trimming the main portion (10), which can comprise milling tools or abrasive strips, are known in the sector and will not therefore be described in further detail.

The pressing device can also be provided with a recovery circuit, configured to recover and return material removed by the trimming device (4) to the feeder device (3). Such recovery circuit comprises a transport device and one or more lines located so as to collect the material removed from the trimming device (4) and bring it to the feeder device (3). The recovery circuit can be provided with various devices for the remixing, granulation and or mixing of the recovered material, or for performing other treatments on the recovered material.

In the embodiment of the system illustrated in FIG. 5, the recovery circuit comprises at least one from between a crushing station (51), a screening station (52) and a moisture regulating station (53). If such stations (51,52,53) are all present, they are preferably arranged in the sequence indicated above.

The recovery circuit can also comprise two or more containers (55,56,57,58), which can be connected to the feeder device (3).

A first container (55) is intended to receive, through a conduit, the material removed from the reflector device (4) or the material processed in the various stations (51,52,53) indicated above, i.e. the secondary material. The first container (55) is connected directly to the feeder device (3), to provide the secondary material thereto. A second container (56) is instead predisposed to contain the primary material. The second container (56), in turn, is connected to the feeder device (3), to provide the primary material thereto.

A part of the material processed by the stations (51,52,53) can be sent to a third container (57).

In the embodiment represented in FIG. 5, there is a fourth container (58), intended to contain the third material, i.e. the more refined and higher quality material, composed for example of an atomized material. In that case, the recovery circuit comprises a mixer (59), placed in communication with the third container (57) and with the fourth container (58). The mixer (59) is predisposed to mix, according to determined proportions, the secondary material coming from the third container (57) and the third material coming from the fourth container (58). The material prepared by the mixer (59) is sent to the second container (56) to be used as primary material.

The invention claimed is:

1. A pressing method for pressing ceramic slabs or tiles, wherein the pressing takes place through a press structured to press a maximum format comprising following steps:

spreading a layer of granular or powdered material on a continuous pressing plane, wherein the layer comprises at least a first zone, made of a granular or powdered primary material, which has a smaller area and border than the maximum format, and at least a second zone, made of a granular or powdered secondary material, different from the primary material, which has an area and border conformed so that the total border and area of the layer correspond to the maximum format;

pressing the layer using a press;

separating at least a main portion of the first zone from the second zone, wherein the primary material of the main portion of the first zone is separated from all of the secondary material.

2. The method according to claim 1, comprising a step of subdividing the main portion into a determined number of portions having a smaller surface area.

3. The method according to claim 1, wherein the second zone comprises one or more lateral zones flanked to the first zone.

4. The method according to claim 1, wherein the first zone has a rectangular border.

5. The method according to claim 4, wherein the second zone comprises one or two lateral zones flanked to opposite sides of the first zone.

6. The method according to claim 5, wherein the second zone comprises one or two transversal zones flanked to opposite sides of the first zone.

7. The method according to claim 1, comprising a step of recovering and reusing the granular or powdered material separated from the main portion for spreading the second zone of another layer.

8. The method according to claim 7, wherein the recovery and reuse step comprises at least a step of crushing the granular or powdered material.

9. The method according to claim 7, wherein the recovery and reuse step comprises at least a step of particle size selection or screening of the granular or powdered material.

10. The method according to claim 7, wherein the recovery and reuse step comprises at least a step of moistening the granular or powdered material.

11. The method according to claim 7, wherein the recovery and reuse step comprises at least a step of mixing the granular or powdered material with a prefixed quantity of primary material.

12. The method according to claim 1, comprising a step of recovering and reusing the granular or powdered material separated from the main portion, wherein a determined quantity of granular or powdered material separated from the main portion is mixed with the primary material for spreading the first zone of another layer.

13. The method according to claim 1, comprising a step of spreading a surface layer of primary material above the layer.

14. The method according to claim 1, comprising a step of spreading a surface layer of a third material above the layer.

15. The method according to claim 14, comprising a step of recovering and reusing the granular or powdered material separated from the main portion, wherein a determined quantity of granular or powdered material separated from the main portion is mixed with the primary material for spreading the first zone of another layer.

16. The method according to claim 1, comprising a step of recovering and reuse the granular or powdered material separated from the main portion for spreading a base or intermediate layer within the thickness of another layer.

17. The method according to claim 1, wherein the pressing of layer uses a pressing die.

18. The method according to claim 1, wherein the primary material of the main portion of the first zone is separated from all of the secondary material in a pressing device.

* * * * *